Oct. 20, 1964  H. A. PELLER  3,153,462
STEERING SYSTEM
Filed Sept. 19, 1962  3 Sheets-Sheet 1

INVENTOR.
Henry A. Peller
BY
Paul J. Reising
ATTORNEY

INVENTOR.
Henry A. Peller
BY
Paul J. Reising
ATTORNEY

United States Patent Office 3,153,462
Patented Oct. 20, 1964

3,153,462
STEERING SYSTEM
Henry A. Peller, Cleveland, Ohio, assignor to General Motors Corporation, Detroit, Mich., a corporation of Delaware
Filed Sept. 19, 1962, Ser. No. 224,807
10 Claims. (Cl. 180—79.2)

This invention concerns a power steering system for vehicles such as earth-moving vehicles and more particularly a system which provides a secondary means for pressurizing hydraulic fluid when the primary means is disabled.

Due to the weight of various rubber-tired self-propelled vehicles of the type utilized in the earth-moving industry, it has been found necessary to use fluid-operated jacks in conjunction with the mechanical steering linkage or solely at times to aid the vehicle operator in steering the vehicles. The usual practice is to have the power steering system receive pressurized hydraulic fluid from a pump which is driven by the vehicle engine, and, therefore, when the engine fails it becomes extremely difficult and at times impossible to move the vehicle from the field to another area in order to make the necessary repairs.

The present invention alleviates the above-mentioned problem by providing a power steering system in which an auxiliary power source is available in the form of an electric motor driven pump. This pump is connected with the usual power steering system of the vehicle and can be placed in a condition for selective operation only when needed by an appropriate master switch mounted on the vehicle and accessible to the operator. The master switch is in an electrical circuit which includes means connected with the steering wheel so that the electric motor is energized to drive the pump and supply pressurized hydraulic fluid to the jacks of the steering system only when steering is desired and when the vehicle is moving in a direction other than straight-ahead.

Figure 1:
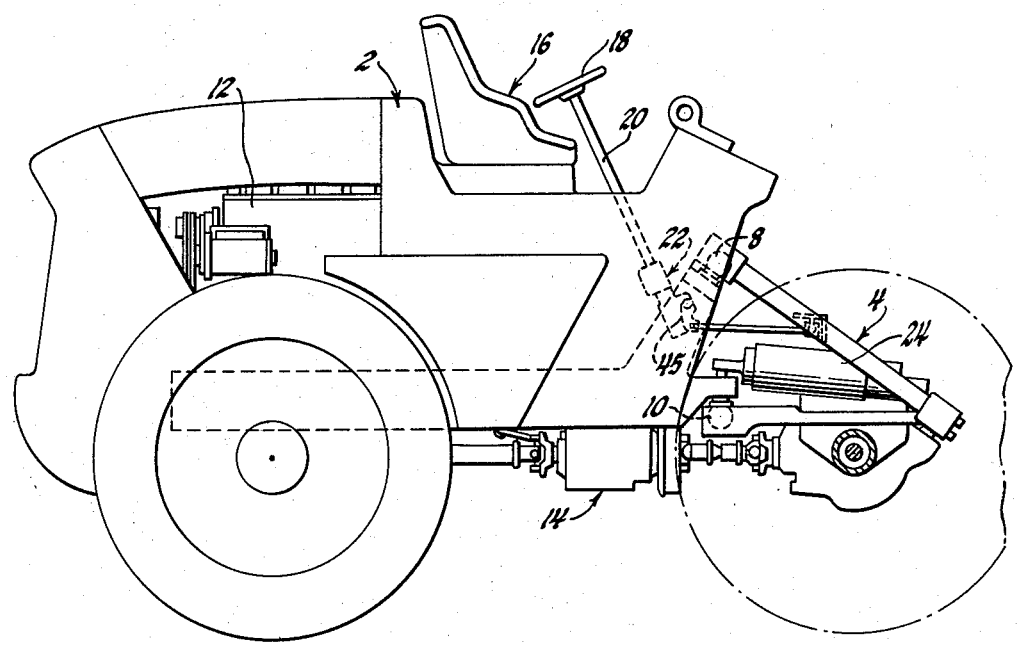
Figure 2:
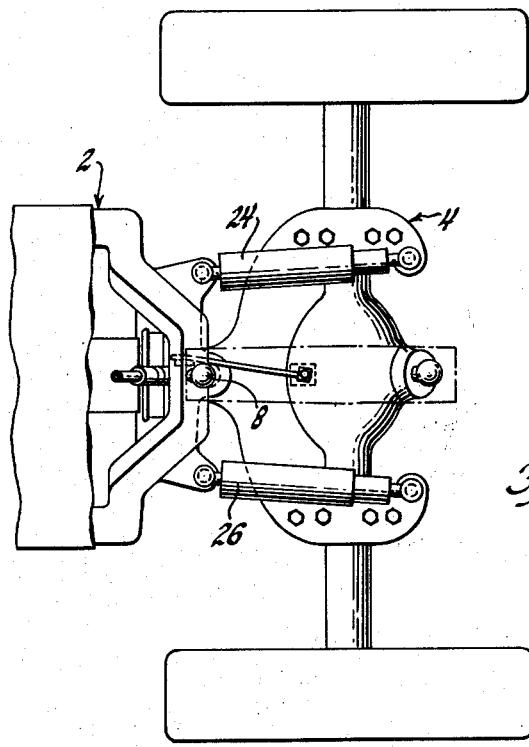
Figure 3:
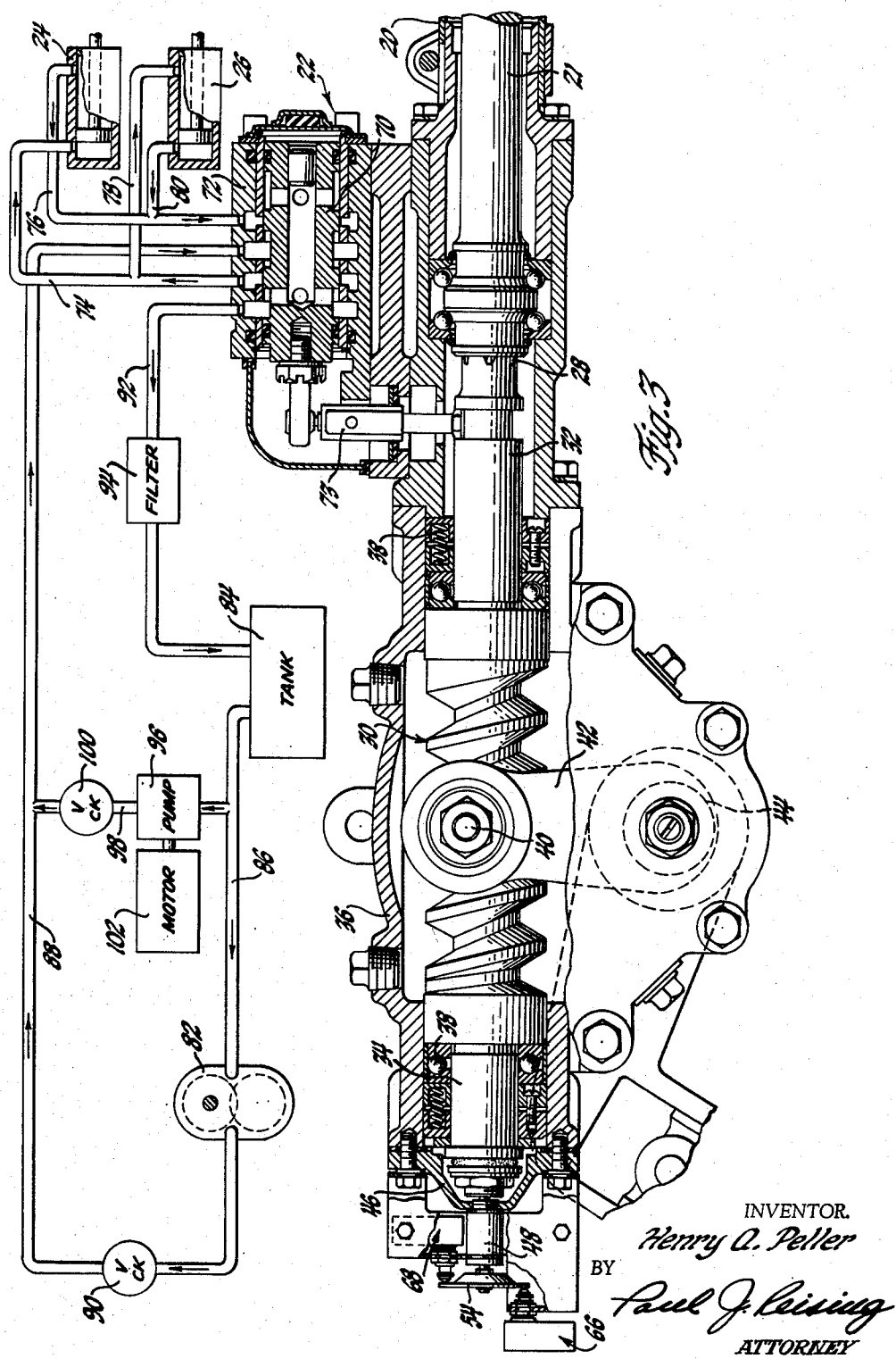
Figure 4:
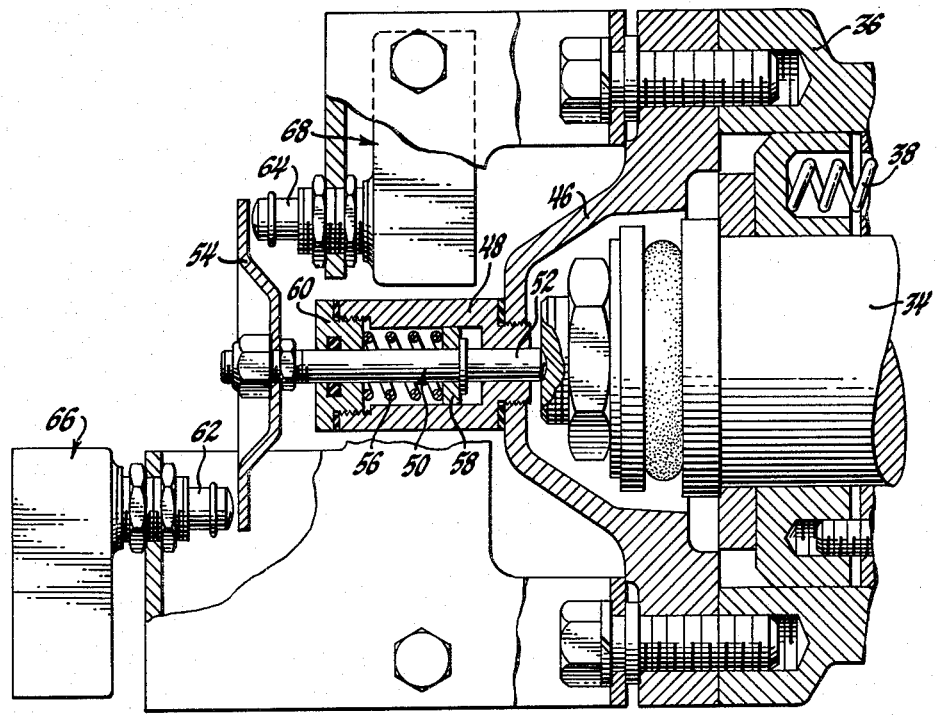
Figure 5:
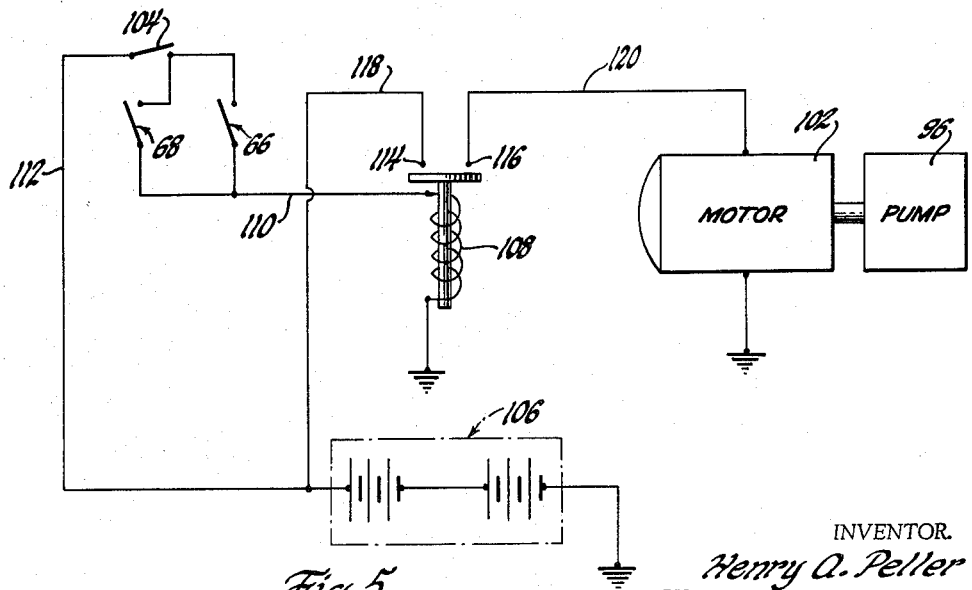

Other advantages and features of the present invention will become more apparent upon reading the description in light of the drawings in which:

FIGURE 1 is an elevation view of an articulated front-end loader incorporating the present invention, FIGURE 2 is a fragmentary plan view showing the front end of the vehicle of FIGURE 1, FIGURE 3 is an enlarged fragmentary sectioned view of the steering apparatus including a schematic of the power steering system, FIGURE 4 is an enlarged fragmentary view of a portion of the steering apparatus shown in FIGURE 3, and FIGURE 5 illustrates the electric circuit incorporated with the present invention.

Referring to the drawings and more particularly to FIGS. 1 and 2, a portion of a front-end loader vehicle is shown comprising a main frame 2 and a secondary frame 4 pivotally interconnected by ball and socket connections 8 and 10 for articulation about a vertical pivot axis passing through the ball joints. The rear frame section 2 supports an engine 12 which is suitably connected through drive means such as that shown at 14 for transmitting drive to the front and rear wheels of the vehicle. An operator station 16 is positioned on the frame section 2 and includes a steering wheel 18 suitably connected to a steering column 20, the free end of which is operatively associated with a valving mechanism 22 that serves to direct fluid to and from a pair of jacks 24 and 26 connected between the frame sections 2 and 4. As best seen in FIG. 3, the hydraulic jacks 24 and 26 are of the double-acting type and include the usual piston, to each side of which fluid may be directed for extending or contracting the respective jack. Thus, when the jack 24 is expanded, jack 26 is simultaneously contracted under pressure so as to articulate the vehicle frame sections about the pivot axis of the ball joints in a counterclockwise direction as viewed in FIGURE 2. Conversely, extension of jack 26 and contraction of jack 24 will cause a counterclockwise articulation of the front frame section 4 relative to the rear frame section 2.

FIGURE 3 shows the valving mechanism 22 incorporated with the steering column 20 and reference will now be made to this figure in order to make more apparent the manner that the mechanical portion of the steering system is combined with the hydraulically operated portion. More specifically, the steering column 20 includes a manually rotatable steering shaft 21 that is connected through a spline connection 28 to a worm gear 30. The latter is integrally formed with a pair of stub shafts 32 and 34 that extend axially from opposite ends of the gear. The worm gear 30 is rotatably and shiftably supported within a steering gear housing 36 by the usual bearings and self-centering spring construction 38 both of which are located at opposite ends of the worm gear. A worm gear follower 40 meshingly engages the worm gear 30 and is rotatably supported at one end of a crank arm 42, with the other end of the crank arm nonrotatably secured to a rock shaft 44 which projects out of the steering gear housing and is nonrotatably secured to a pitman arm 45 shown in FIGURE 1. As more clearly shown in FIGURE 4, a cap member 46 is fastened to the end of the gear housing 36 and has fixed thereto a cylindrical member 48. The cylindrical member is centrally located and in axial alignment with the worm gear 30 and includes a slidable shaft or rod 50 that is engageable at one end 52 with the terminal portion of the stub shaft 34 and has a disc-type contact plate 54 rigidly secured to the opposite end. The shaft 50 is reciprocably supported in the member 48 which also houses a coil spring 56 that encircles the shaft, and is disposed between a stop washer 58 rigid with the shaft and a plug 60 that closes the free end of the member 48. The contact plate is adapted to alternately engage the heads 62 and 64 of a pair of microswitches 66 and 68 which are rigidly secured by connecting bracket members to the cap member 46 and located at oppositely disposed surfaces of the plate 54. The purpose of the latter will be more clearly explained hereinafter in connection with the operation of the hydraulic steering system.

The valving mechanism 22 is rigidly secured to one side of the steering column 20 and includes a spool valve 70 which is reciprocably mounted within a housing 72 having a plurality of ports formed therein so that upon appropriate positioning of the spool valve, fluid under pressure may be selectively directed to and vented from one end or the other of the jacks 24 and 26 by the main conduits 74 and 76 which respectively connect to the branch conduits 78 and 80. The spool valve, as shown in FIGURE 3, is normally located in the neutral-hold position with the result that the hydraulic fluid is locked in the respective jacks and the latter maintain their positions. Shifting of the valve to an operating position occurs in response to axial movement of the worm gear 30 which is connected to the spool valve by a pivot lever 73. Thus, with this arrangement, assuming the vehicle is disposed in a straight-ahead position and the vehicle operator rotates the steering wheel 18 so as to cause rotation of the worm gear 30, the driven or follower member 40 due to its rigid connection reacts against the worm gear and thereby provides a resistance to the steering movement. This resistance results in axial shifting movement of the worm gear and stub shaft 32 thereby causing the valve spool to be reciprocated in the proper direction depending upon the direction of steer. Accordingly, the jacks 24 and 26 are pressurized to articulate the frame section 4 relative to the frame section 2. It should be understood that where the spool valve is positioned to the left of neutral hold, pressurized fluid is directed through conduits 74 and 78 to the piston-head end of jack 24 and the piston-rod end of jack 26. At the same time, the opposite ends of the respective jacks are vented through the conduits 76 and 80 so that jack 24 is expanded while jack 26 contracts and the frame section 4 pivots in a clockwise direction as viewed in FIGURE 2. Of course, movement of the spool valve to the right of neutral-hold causes the opposite effect so that the respective jacks 24 and 26 are contracted and expanded to move the frame section 4 in a counterclockwise direction about the steering axis.

The valving mechanism 22 receives a continuous supply of pressurized hydraulic fluid from an engine driven pump 82 that draws fluid from a tank 84 via an interconnecting conduit 86. The pressurized fluid is delivered to the valving mechanism by a conduit 88 which has a check valve 90 for preventing fluid from returning to the pump. In the neutral-hold position of spool valve 70, the fluid passes through the check valve 90 and conduit 88 to the valving mechanism 22 where it is blocked by the spool valve. As explained above, when the spool valve moves to an operating position, the pressurized fluid is diverted to the jacks with the vented fluid returning to tank.

Pressurized hydraulic fluid can also be supplied to the valving mechanism by an auxiliary pump 96 provided in a conduit 98 which interconnects the conduits 88 and 86 so as to short-circuit the pump 82 as will be explained hereinafter. A check valve 100 is provided in conduit 98 and as in the case of check valve 90, serves to prevent fluid from returning to the adjacent pump. An electric motor 102 is drivingly connected to the pump 96, and when energized, serves to draw hydraulic fluid from the tank 84 and deliver it via conduit 98, check valve 100, and conduit 88 to the valving mechanism 22.

As best seen in FIGURE 5, energization of the electric motor is controlled by an electric circuit that includes the microswitches 66, 68, a manually operable master switch 104 which is located on the vehicle so as to be readily accessible to the vehicle operator, a power source 106 such as the vehicle battery, and a relay 108. The microswitches are electrically connected together in parallel while one terminal of each microswitch is connected in series by line 110 to the coil of the relay which in turn is connected to ground or the negative terminal of the battery. The positive battery terminal is connected by line 112 to the master switch 104 which is in series with the microswitches. The relay has the usual armature which, upon energization of the coil, is adapted to electrically connect terminals 114 and 116 of the respective lines 118 and 120 so as to provide electrical current from the battery to the windings of the electric motor 102 and thereby drive the pump 96.

From the above description it should be apparent that whenever the engine of the vehicle is operating the pump 82 supplies pressurized hydraulic fluid to the valving mechanism for activating the jacks 24 and 26 in response to the turning of the steering wheel 18. As aforedescribed, rotation of the steering wheel causes corresponding rotation of the steering shaft 21 and the worm gear 30 with the result that the latter moves axially against the bias of the springs 38. Inasmuch as the worm gear 30 is integral with the stub shaft 34 a corresponding axial movement of the latter also occurs. Thus, assuming the steering wheel is turned so as to cause the worm gear 30 to shift to the left as viewed in FIGURES 3 and 4, this movement will cause the shaft 50 to be moved against the spring 56 to cause the contact plate 54 to engage the head 62 of the microswitch 66 and close the latter. On the other hand, where the steering wheel is rotated in the opposite direction, the worm gear 30 shifts to the right and the terminal end of the stub shaft 34 moves in a corresponding direction so that the spring 56 acts against the washer 58 to move the shaft to the right and cause engagement between contact plate 54 and the head 64 to close the microswitch 68. It should be understood that while the vehicle engine is operating to drive the pump 82, it is unnecessary to operate the pump 96 and therefore the master switch 104 is maintained open so that closing of either of the microswitches has no effect on the electric motor. However, in the event that the engine 12 should fail, the pump 82 would be inoperative and vehicle steering disabled. Hence, movement of the vehicle for repairs would ordinarily be very difficult if not impossible especially where it is desired to tow the vehicle from the field to another location. However, with this invention, the vehicle operator simply closes master switch 104 to place the electric control circuit of FIGURE 5 in an operable condition so that upon rotation of the steering wheel in one direction or the other from the straight-ahead position, one of the microswitches 66, 68 is closed to energize the relay 108, which in turn, activates the electric motor 102. The electric motor, of course, will drive the pump 96 and supply sufficient pressurized fluid to the valving mechanism 22 for operating the jacks 24, 26 and, accordingly, provide steering of the vehicle.

It should be noted that an important feature of this invention is that where the vehicle is moving in the straight-ahead position, the contact plate 54 is disposed between the microswitches, as shown in FIGURE 4, without engaging either and, therefore, in order to energize the electric motor to drive the pump 96, a rotating movement of the steering wheel is necessary. Thus, when it is desired to use the electric driven power source, the latter repeatedly cycles in accordance with steering gear rotation. For this reason, the system draws a limited amount of power from the vehicle batteries, inasmuch as the electric motor is operating only when steering is necessary.

It should be apparent that various changes and modifications can be made in the above described system without departing from the spirit of the invention. Such changes and modifications are contemplated by the inventor and he does not wish to be limited except by the scope of the appended claims.

I claim:
1. In a vehicle having an engine and steerable wheels, a hydraulic circuit including a source of hydraulic fluid, hydraulic operating means in the circuit for moving the wheels about the steering axis, manually operated means, a first pump driven by the engine, first means responsive to movement of the manually operated means for selectively supplying fluid from the pump to the hydraulic operating means, a second pump in said circuit for supplying fluid to the first means, an electric motor for driving said second pump, a power source for said electric motor, second means for connecting said electric motor with the power source and third means connected with the electric motor and the manually operated means whereby movement of the latter to steer the vehicle causes the electric motor to be energized in the event the engine is inoperable to drive the first pump.

2. In a vehicle having an engine and steerable wheels, a hydraulic circuit including a source of hydraulic fluid, hydraulic operating means in the circuit for moving the wheels about the steering axis, manually operated means, a first pump driven by the engine, valving means responsive to movement of the manually operated means for selectively supplying fluid from the pump to the hydraulic operating means, a second pump in said circuit for supplying fluid to the valving means, an electric motor for driving said second pump, an electric circuit including a power source for energizing the electric motor, a switch for electrically connecting the power source with the electric motor, means in said electric circuit electrically connected with the manually operated means whereby movement of the latter to steer the vehicle when said switch is closed causes the electric motor to be energized in the event the engine is inoperable.

3. In a vehicle having an engine and steerable wheels, a hydraulic circuit including a source of hydraulic fluid, hydraulic operating means in the circuit for moving the wheels about the steering axis, manually operated means, a first pump driven by the engine, valving means responsive to movement of the manually operated means for selectively supplying fluid from the pump to the hydraulic operating means for turning said wheels, a second pump in said circuit for supplying fluid to the valving means, an electric motor for driving said second pump, an electric circuit including a power source for energizing the electric motor, a switch for electrically connecting the power source with the electric motor, means in said electric circuit electrically connected with the manually operated means whereby movement of the latter to steer the vehicle when said switch is closed causes the electric motor to be energized in the event the engine is inoperable, and pressure responsive valves in said hydraulic circuit located between each pump and the valving means to prevent hydraulic fluid from being redirected to the source prior to passing through said valving means.

4. In a vehicle having an engine and steerable wheels, a double acting hydraulic jack operatively associated with said wheels for actuating the latter about the steering axis of the wheels, manually operable control means, valving means responsive to movement of said means, a hydraulic circuit connecting said valving means to the jack, a hydraulic fluid source, a first pump driven by said engine and located in said circuit between the source and valving means for supplying pressurized fluid to the latter, a second pump in said hydraulic circuit, an electric motor for driving the second pump, an electric circuit including a power source for energizing said electric motor, a switch in the electric circuit and operatively associated with the control means, said switch adapted to be closed in response to movement of the control means, a second switch in said circuit, said second switch adapted when closed to place said electric circuit in a condition for energizing the electric motor to drive the second pump when the control means is turned so as to supply fluid to the valving means in the event the engine is inoperable to drive the first pump.

5. In a rubber-tired vehicle having a pair of frame sections articulated about a vertical steering axis, an engine supported by one of the frame sections for driving the vehicle, a double-acting jack connecting said frame sections so as to provide relative movement of the sections about said axis when the jack is expanded and contracted, a control column mounted on the vehicle for rotation and having switch means at the one end thereof, reaction means operatively associated with said column so that rotation of the steering wheel in either direction causes the said one end of the column to move axially to close the switch means, a hydraulic circuit for supplying hydraulic fluid to said jack, valving means in the circuit, means operatively connecting the said one end of the control column to the valving means so that rotation of the steering wheel causes the valving means to shift and direct hydraulic fluid to the jack, a first pump driven by the engine and located in said circuit for directing hydraulic fluid to the valving means, a second pump in the circuit, an electric motor for driving the second pump, an electric circuit including a power source for energizing said electric motor, means for electrically connecting said power source with said electric motor, said switch means located in said electric circuit between the last mentioned means and the electric motor so that in the event of engine failure turning of the steering wheel closes the switch means to connect the power source with the electric motor to drive the second pump.

6. In a rubber-tired vehicle having a pair of frame sections articulated about a vertical steering axis, an engine supported by one of the frame sections for driving the vehicle, a double-acting jack connecting said frame sections so as to provide relative movement of the sections about said axis when the jack is expanded and contracted, a control column mounted on the vehicle for rotation and having switch means at the one end thereof, reaction means operatively associated with said column so that rotation of the steering wheel in either direction causes the said one end of the column to move axially to close the switch means, a hydraulic circuit for supplying hydraulic fluid to said jack, valving means in the circuit and operatively connected to the control column so that movement of the steering wheel causes the valving means to direct hydraulic fluid to the jack, a first pump driven by the engine and located in said circuit for directing hydraulic fluid to the valving means, a second pump in the circuit, an electric motor for driving the second pump, an electric circuit including a power source for energizing said electric motor, means for electrically connecting said power source with said electric motor, said switch means located in said electric circuit between the last mentioned means and the electric motor so that in the event of engine failure turning of the steering wheel closes the switch means to connect the power source with the electric motor to drive the second pump.

7. In a rubber-tired vehicle having a pair of frame sections articulated about a vertical steering axis, an engine supported by one of the frame sections for driving the vehicle, a double-acting jack connecting said frame sections adjacent the steering axis so as to provide relative movement of the sections about said axis when the jack is expanded and contracted, a control column mounted on the vehicle for rotation and having a manually operable steering wheel at one end and switch means at the other end, reaction means operatively associated with said column so that rotation of the steering wheel in either direction causes the said other end of the column to move axially to close the switch means, a hydraulic circuit for supplying hydraulic fluid to said jack, valving means in the circuit and operatively connected to the said one end of the control column so that movement of the steering wheel causes the valving means to shift and thereby direct hydraulic fluid to the jack, a first pump driven by the engine and located in said circuit for directing hydraulic fluid to the valving means, a second pump in the circuit, an electric motor for driving the second pump, an electric circuit including a power source for energizing said electric motor, means for electrically connecting said power source with said electric motor, said switch means located in said electric circuit between the last mentioned means and the electric motor so that in the event of engine failure turning of the steering wheel closes the switch means to connect the power source with the electric motor to drive the second pump.

8. In a rubber-tired vehicle having a pair of frame sections articulated about a vertical steering axis, an engine supported by one of the frame sections for driving the vehicle, a double-acting jack connecting said frame sections adjacent the steering axis so as to provide relative movement of the sections about said axis when the jack is expanded and contracted, a control column mounted on the vehicle for rotation and having a manually operable steering wheel at one end, a member supported for shiftable movement and connected to the other end of the control column, switch means operatively associated with the member, reaction means operatively associated with said member so that rotation of the steering wheel in either direction causes the member to move axially to open and close the switch means, a hydraulic circuit for supplying hydraulic fluid to said jack, valving means in the circuit and operatively connected to the member so that rotation of the steering wheel from the straight-ahead position causes the valving means to shift from a neutral position and direct hydraulic fluid to the jack, a first pump driven by the engine and located in said circuit for directing hydraulic fluid to the valving means, a second pump in the circuit, an electric motor for driving the second pump, an electric circuit including a power source for energizing said electric motor, means for electrically connecting said power source with said electric motor, said switch means located in said electric circuit between the last mentioned means and the electric motor so that in the event of engine failure turning of the steering wheel closes the switch means to connect the power source with the electric motor to drive the second pump.

9. The device as set forth in claim 8 in which said member includes a stub shaft portion, said switch means comprising a pair of spaced microswitches, a contact member disposed between the microswitches, and means connecting the contact member with the stub shaft whereby rotation of the steering wheel in one direction from the vehicle straight-ahead position causes the contact member to engage one of the microswitches and rotation of the steering wheel in the opposite direction from vehicle straight-ahead position causes the contact member to engage the other of said microswitches.

10. The device as set forth in claim 9 in which the last mentioned means comprises a rod having one end fixed to the contact member and the other end engaging the stub shaft, and spring means continuously urging the rod in one direction.

References Cited in the file of this patent
UNITED STATES PATENTS

| | | |
|---|---|---|
| 2,918,135 | Wittren | Dec. 22, 1959 |
| 2,964,601 | Stockwell | Dec. 13, 1960 |
| 2,981,356 | Bernotas | Apr. 25, 1961 |